March 11, 1930.　　　J. E. PALMER　　　1,749,922
COLLAPSIBLE TIRE BUILDING FORM
Original Filed Sept. 23, 1927　　3 Sheets-Sheet 1

INVENTOR.
John E. Palmer.
BY Ely & Barrow
ATTORNEYS.

March 11, 1930.  J. E. PALMER  1,749,922
COLLAPSIBLE TIRE BUILDING FORM
Original Filed Sept. 23, 1927   3 Sheets-Sheet 2

INVENTOR.
John E. Palmer.
BY Ely & Barrow
ATTORNEYS.

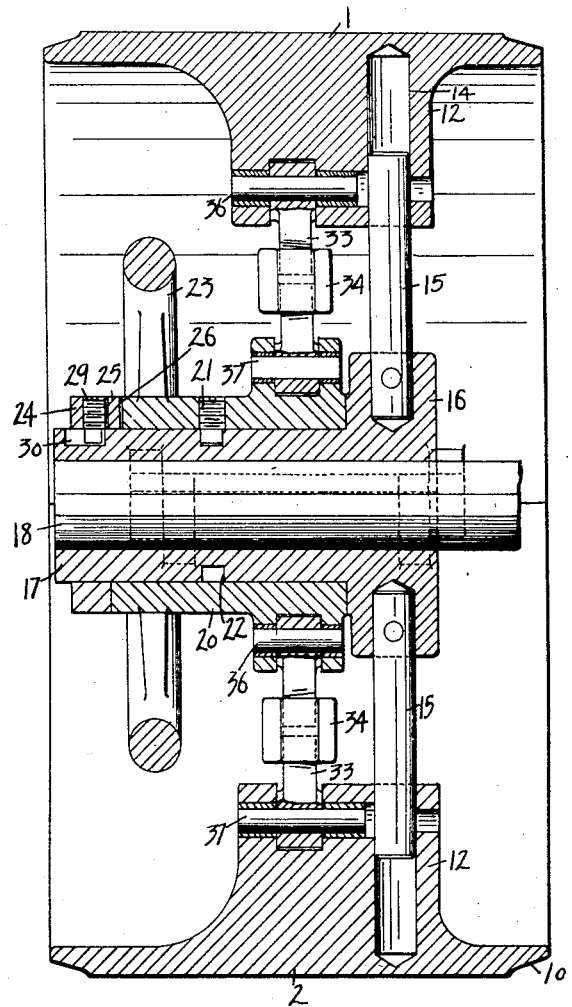

Patented Mar. 11, 1930

1,749,922

UNITED STATES PATENT OFFICE

JOHN E. PALMER, OF AKRON, OHIO, ASSIGNOR TO THE SUMMIT MOLD & MACHINE COMPANY, OF AKRON, OHIO, A CORPORATION OF OHIO

COLLAPSIBLE TIRE-BUILDING FORM

Application filed September 23, 1927, Serial No. 221,484. Renewed January 22, 1930.

The present invention relates to the art of building pneumatic automobile tires, particularly by the so-called "flat band" or "drum" method, in which the tire carcass is built up in substantially cylindrical form, being shaped into tire formation after the elements constituting the carcass are laid up about a drum or form. In the manufacture of straight-side tires in which the usual wire reinforced bead of triangular cross section is employed, it is necessary to provide the drum with a bead seat of somewhat smaller diameter than the central portion of the band so that the drum must be made in collapsible form to permit the removal of the completed carcass.

Various designs of collapsible drums for this purpose have been used prior to this invention, it being the object of the present invention to improve upon the design of the drum and the organization of the collapsing mechanism whereby the collapsing of the drum is accomplished more easily and quickly than with the prior constructions.

The invention is illustrated and described in detail herein so that its principle and operation may be readily understood. It is not, however, the intention to limit or confine the invention to such details, for modifications and variations thereof may be made within the scope of the invention as set forth in the claims appended hereto.

In the drawings:

Figure 3 is a section on the line 3—3 of Figure 1.

Figure 1:
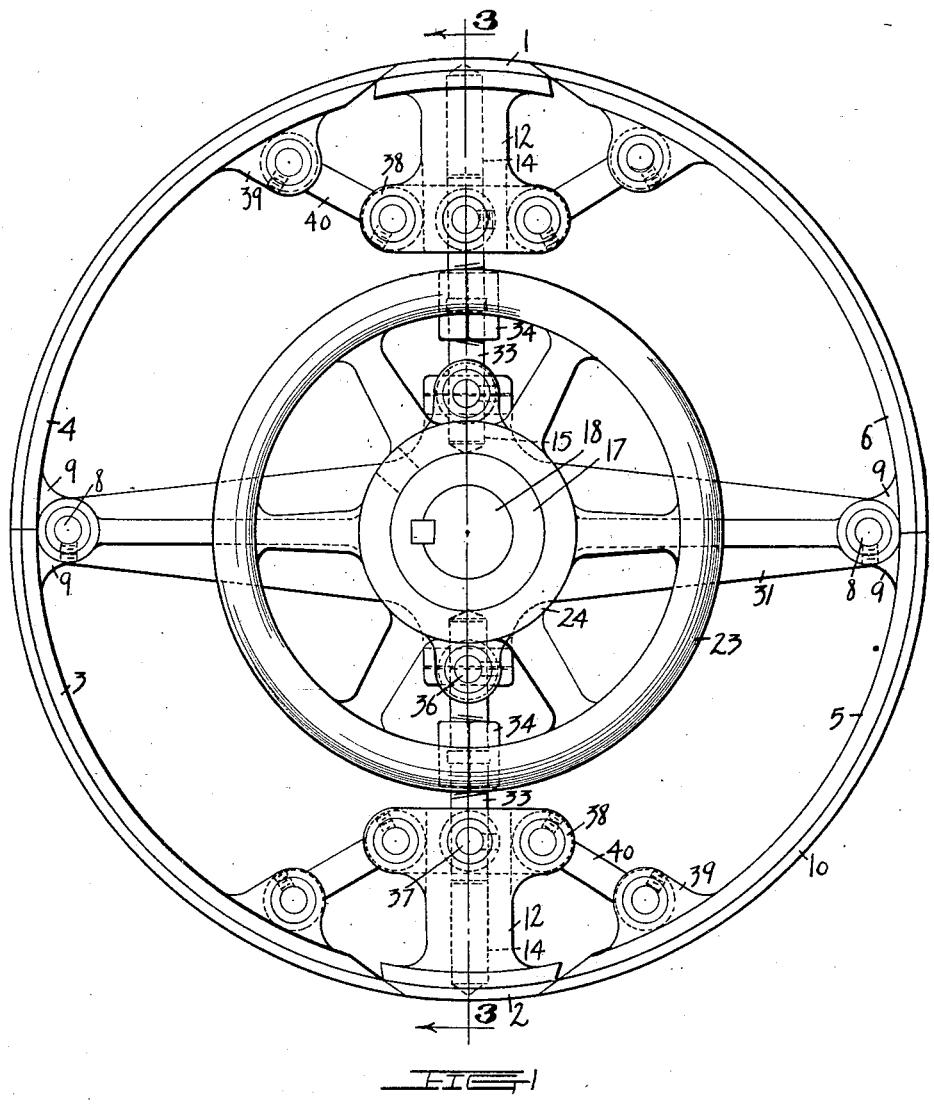
Figure 1 is a side view of the improved drum in expanded or erected position.

The drum or form body is composed of a plurality of sections or segments, of which the segments 1 and 2 are placed opposite one another and being shorter than the remaining sections and tapered outwardly of the drum may be designated as key sections. The remainder of the core is composed of larger sections 3, 4, 5 and 6, of which the sections 3 and 4 constitute one pair of sections and the sections 5 and 6 the other pair. The sections or half sections 3 and 4 and 5 and 6 are hinged together at their abutting ends by a pin 8 passing through lugs 9 on the sections. When the form is in erected or expanded condition, all of the sections form a complete circular drum with depressed edges or bead seats 10 for the reception of the beads.

The sections 1 and 2 are formed with inwardly extending bearings 12 which are provided with radial passages 14 by means of which the sections are guided over radial pins 15 secured in a flange 16 of a rotary hub 17 at the center of the form, the hub being keyed upon a centrally located shaft 18 of the tire building machine or stand upon which the drum is mounted and by which shaft it is rotated.

Upon the hub 16 is rotatably mounted an operating sleeve 20 which is held in position thereon by a set screw or pin 21 entering a groove 22 about the hub. The sleeve is rotated by a hand wheel 23 and is locked in position upon the hub by a sliding collar 24 formed with a tooth 25 which engages a notch 26 in the end of the sleeve. The collar is held upon the hub by a set screw 29, the inner end of which engages a short slot 30 in the hub and is movable for a limited distance along the hub to lock or release the operating collar. The hub is provided with radial arms 31 which support the hinge pins 8.

The collar is connected to the key sections by means of links 33, made in two parts and adjustable by a turn-buckle 34. The inner ends of the links are pivoted to the collar upon pins 36 and to the key sections by pins 37 located in the bearings 12. When the drum is expanded, the links 33 may be moved slightly past center, if desired, being held in their expanded position by the collar 24.

Figure 2:
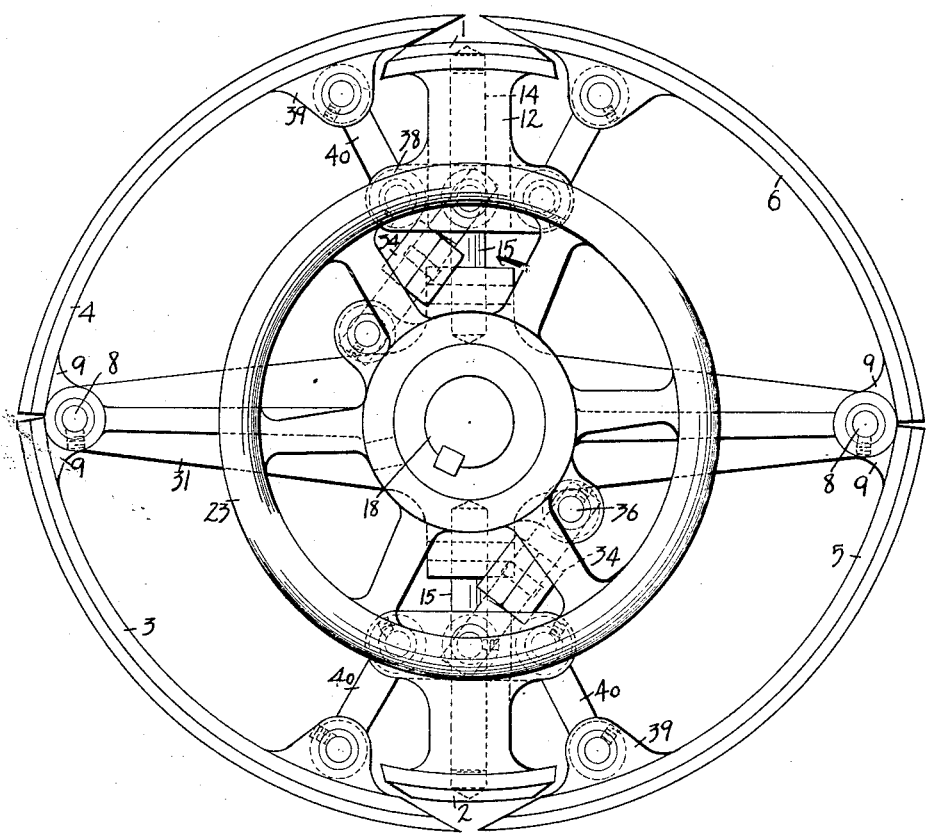
Figure 2 is a similar view of the drum in collapsed position.

The key sections and the next adjacent sections of the drum are parted along oblique lines so as to permit the sections to overlap as shown in Figure 2, when the drum is collapsed. This is accomplished by providing the bearings 12 with laterally extending lugs or shoulders 38 which are connected to lugs 39 on the adjacent sections by means of short links 40.

When the tire carcass or band is completely assembled upon the drum in circular condition, as shown in Figure 1, it is collapsed to the substantially oval condition shown in Figure 2 by rotation of the hand wheel 23 after the collar 24 has been released. It will be noted that the major axis of the oval or elliptical formation of the core when collapsed substantially equals the normal diameter of the core. The rotation of the collar breaks the links and moves the key sections 1 and 2 inwardly upon their guiding pins. As the key sections move inwardly, the links 40 rock the pivoted sections together, the ends of the sections overlapping the key sections when the drum is fully collapsed. The band may now be removed from the drum with slight distortion which permits it to clear the points where the swinging sections are pivoted. The drum is expanded by reverse movement of the hand wheel.

The construction which is shown and described is simple and easy to operate and by its use the drum is collapsed more rapidly than previous forms of collapsible drums. It will be observed that the drum is in circular form when expanded, but that its outer perimeter when in collapsed position is substantially elliptical, the points 8 being fixed in both positions.

What is claimed is:

1. In a collapsible tire building form, the combination of a form body composed of a plurality of sections, certain of the sections being tapered outwardly of the form and arranged oppositely of one another, the remaining sections being arranged in pairs hinged together and located between the first named sections, a collapsing mechanism at the center of the form and connected directly with the first named sections, and means to rock the remaining sections about their pivots as the first named sections are moved toward and from the axis of the core.

2. In a collapsible tire building form, the combination of a form body composed of a plurality of sections, certain of the sections being key sections, the remainder of the sections being arranged in pairs hinged together, and means to move the key sections toward and from the axis of the core and simultaneously to move the hinged sections about their pivots.

3. In a collapsible tire building form, a rotary hub, radial arms extending from the hub, pairs of form sections pivoted on the end of each arm, key sections lying between the pairs of the hinged sections, links connecting the key sections with adjacent hinged sections, and means to move the key sections toward and from the axis of the form.

4. In a collapsible tire building form, a rotary hub, radial arms extending from the hub, pairs of form sections pivoted on the end of each arm, key sections lying between the pairs of the hinged sections, links connecting the key sections with adjacent hinged sections, a rotatable operating sleeve upon the hub, and links connecting the sleeve and the key sections.

5. A collapsible sectional tire building form which is circular in outline when expanded, means to support the form upon two fixed points, and means to move all the sections of the form so that it assumes a substantially oval outline when collapsed.

6. A collapsible tire building form which is circular in outline when expanded, the form being composed of a plurality of sections, and means for withdrawing certain of the sections inwardly of the form and moving all the other sections so that they constitute a substantial ellipse in collapsed condition, the major axis of the ellipse being equal to the diameter of the form in expanded condition.

7. A collapsible tire building form, the form being composed of a plurality of sections all of which are movable to collapse the form, fixed pivots in the drum, means for rocking certain of the sections about the pivots, and means for withdrawing certain of the sections to locations within the outer perimeter of the form.

8. A collapsible tire building form comprising a plurality of sections and which is circular in outline when expanded, and means to move all the sections to render the form substantially elliptical in outline when collapsed, the major axis of the ellipse being not less than the diameter of the form in expanded condition.

9. A collapsible tire building form which is circular in outline when expanded, the form being composed of a plurality of sections connected together, pivots in the drum, and means for moving certain of the sections lying between the pivots within the outer perimeter of the drum when it is collapsed, the remaining sections of the drum rocking upon said pivots.

10. A collapsible tire building form which is circular in outline when expanded, the form being composed of a plurality of sections connected together, pivots in the drum, and means for moving certain of the sections lying between the pivots within the outer perimeter of the drum when it is collapsed, the remaining sections of the drum rocking upon said pivots, the said pivots being fixed whereby the drum in collapsed position is in the form of a substantial ellipse with a major axis equal to the diameter of the expanded form.

11. A collapsible tire building form composed of six sections, two of said sections being key sections and lying opposite to one another, the remaining sections being arranged in pairs hinged together, and a common operating means to move the key sections radially and simultaneously to rock the hinged sections.

12. A collapsible tire building form composed of six sections, two of said sections being key sections and lying opposite to one another, the remaining sections being arranged in pairs hinged together, and a common operating means to move the key sections radially to positions within the outer perimeter of the form and simultaneously to rock the hinged sections.

13. A collapsible tire building form comprising a rotary hub, arms extending diametrically of the hub, pivots in the ends of said arms, guides extending diametrically of the hub at right angles to the arms, form sections hinged upon the pivots, key sections slidable upon the arms, an operating member rotatable upon the hub, links extending from the operating member to the key sections, and links connecting the key sections and the ends of the form sections.

14. A collapsible tire building form comprising a rotary hub, arms extending diametrically of the hub, pivots in the ends of said arms, guides extending diametrically of the hub at right angles to the arms, form sections hinged upon the pivots, key sections slidable upon the arms, an operating member rotatable upon the hub, links extending from the operating member to the key sections, and means to connect the key sections and the ends of the hinged sections.

15. A collapsible circular tire building form comprising a form body composed of a plurality of sections, and means to move all of the sections simultaneously toward and from the center of the form to change the outline of the form to an ellipse, the major axis of which is equal to the diameter of the form in expanded condition.

16. A collapsible circular tire building form comprising a form body composed of a plurality of sections, and means to move all of the sections simultaneously toward the axis of the core to reduce the diameter of the core in one direction while it is fixed in another direction.

JOHN E. PALMER.